United States Patent [19]

Woodrow

[11] Patent Number: 4,770,269
[45] Date of Patent: Sep. 13, 1988

[54] CLOSED AIR SYSTEM SEISMIC WAVE GENERATOR

[75] Inventor: Andrew B. Woodrow, Plano, Tex.

[73] Assignee: Atlantic Richfield Company, Los Angeles, Calif.

[21] Appl. No.: 77,355

[22] Filed: Jul. 24, 1987

Related U.S. Application Data

[63] Continuation of Ser. No. 455,172, Jan. 3, 1983, abandoned.

[51] Int. Cl.[4] .............................................. G01V 1/147
[52] U.S. Cl. ................................... 181/121; 181/119; 267/124; 267/129; 173/119
[58] Field of Search .............. 181/113, 114, 119, 121; 367/143, 189, 190; 124/56, 68, 69; 137/831; 173/116, 119, 134, 135; 267/124, 125, 128, 129

[56] References Cited

U.S. PATENT DOCUMENTS

| | | | |
|---|---|---|---|
| 3,346,251 | 10/1967 | Bittel | 267/128 |
| 3,642,089 | 2/1972 | Parker et al. | 367/146 |
| 3,868,097 | 2/1975 | Taylor | 267/124 |
| 4,100,991 | 7/1978 | Airhart | 181/117 |
| 4,230,201 | 10/1980 | Bays | 181/115 |
| 4,284,164 | 8/1981 | Airhart | 181/117 |
| 4,284,165 | 8/1981 | Airhart et al. | 181/119 |
| 4,484,657 | 11/1984 | Barta | 181/121 |
| 4,702,344 | 10/1987 | Airhart | 181/121 |

Primary Examiner—Charles T. Jordan
Assistant Examiner—Brian S. Steinberger
Attorney, Agent, or Firm—Robert M. Betz; Robert D. Lott

[57] ABSTRACT

Apparatus for generating seismic waves including an upstanding hollow cylindrical housing within which an impact piston latched in a cocked position is adapted to be propelled downwardly by high pressure expanding gas in the confined chamber above it within the housing so as to strike a target plate resting on the ground adjacent the lower end of the housing. After each blow against the target, the piston is retracted upwardly by means of hydraulic cylinders which recompress the gas in the chamber to its original pressure. Since there is no need for recharging the pressure chamber after each shot, economical rapid cycle operation is facilitated.

4 Claims, 2 Drawing Sheets

CLOSED AIR SYSTEM SEISMIC WAVE GENERATOR

This is a continuation of application Ser. No. 06/455,172, filed Jan. 3, 1983, now abandoned.

BACKGROUND OF THE INVENTION

1. Field of the Invention

This invention relates generally to the field of seismic prospecting and more particularly to a method and apparatus for injecting a seismic wave into the earth.

2. Description of the Prior Art

U.S. Pat. No. 4,284,165 issued Aug. 18, 1981 to Airhart and Barta teaches an apparatus for generating an acoustic pulse by propelling a mass downwardly by gas pressure against a rigid target in contact with the earth. The attained kinetic energy of the moving mass is transferred to the earth over a very short period of time. In this device, compressed gas is introduced within the hollow cylindrical housing which supports the impact mass by means of continuously repressurized high volume accumulators. The piston is provided with means for guiding its travel along the bore of the housing, but the piston has no seal rings. Therefore, with each operation of this device, gas pressure escapes to atmosphere through the bottom of the housing and must be replenished. The retraction of the impact piston to its initial position does not restore this lost pressure.

Another prior art device for generating seismic waves through high energy impact of a moving piston against a rigid target is described in U.S. Pat. No. 4,284,164 issued Aug. 18, 1981 to Airhart. As in the previously described patent, a piston is propelled downwardly within a cylindrical housing by a high pressure expanding gas delivered from external high volume accumulators. Although in this device, the downwardly moving piston is provided with seal rings which prevent escape of gas downwardly along the bore of the housing in which the piston moves, the expanding gas which drives the piston downwardly is simultaneously discharged upwardly through constricted vent passages in the top of the housing.

Since devices of the character described do not employ completely enclosed pressure systems, they can only be operated successively with the use of high volume accumulators and powerful compressors to repressurize them. The time required for this continual repressurization limits the rate at which these devices may be recycled. The number and size of the compressors required also add significantly to the expense of installation and operation.

The general object of this invention is, therefore, to provide an improved seismic wave generator of the impulse type utilizing gas pressure as the propulsion means.

It is a more particular object of this invention to provide a device of the character described which facilitates rapid operation with enhanced economy.

Other objects and advantages of this invention will become apparent from a consideration of the detailed description to follow taken in conjunction with the drawings and the appended claims.

SUMMARY OF THE INVENTION

In accordance with the preferred embodiment of this invention, an impact piston is interfitted within the bore of an upstanding hollow cylindrical housing having a closed top and open bottom so as to create an enclosed gas pressure chamber above such piston of variable volume. In its upward cocked position, the piston is supported above a target resting on the earth. Upon release of this support means, the piston is propelled downwardly by gas pressure to strike the target, thereby suddenly transferring its attained kinetic energy to such target. The resultant downward acceleration of the target deforms the earth elastically to generate a seismic wave. Means are provided for initially filling the space above the piston with gas from an external source at a first lower pressure in the bottom-most piston position. By means of a plurality of hydraulic cylinders aligned with the housing, the impact piston is lifted from such bottommost position to its cocked position thereby increasing the pressure in the confined chamber space above it to a second higher value. Since the piston is provided with airtight seals, the chamber is therefore repressurized to substantially the same pressure after each shot. Thus the device can be operated repetitively at a rapid rate without requiring external gas supply means.

BRIEF DESCRIPTION OF THE PREFERRED EMBODIMENTS

Figure 1:
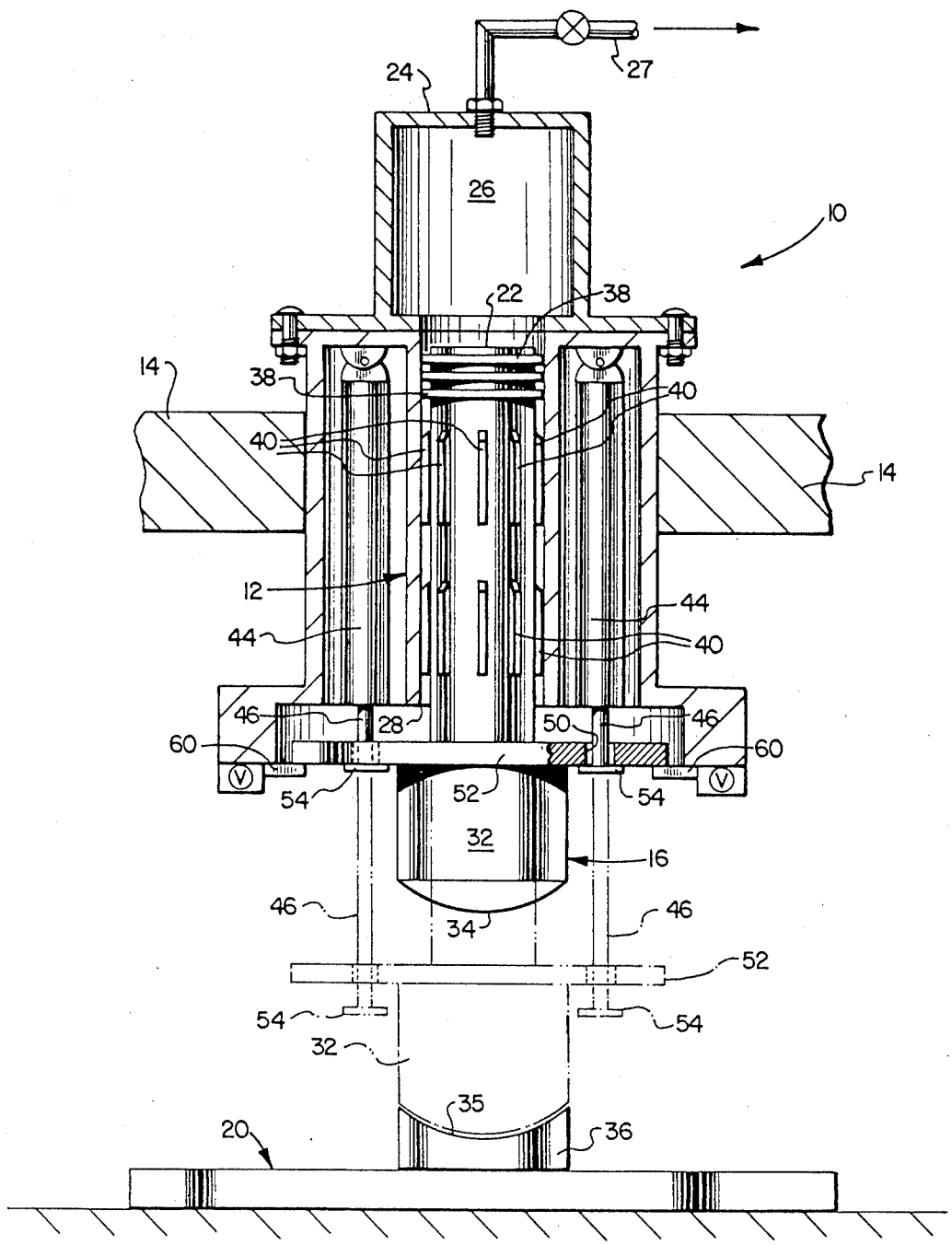
FIG. 1 is a sectional view of a seismic wave generator in accordance with the preferred embodiment of this invention.

With reference now to FIG. 1, a seismic wave generator 10 is seen to consist generally of an upstanding hollow cylindrical housing 12 supported by means of frame 14 from any desired transport vehicle (not shown) in spaced relation above the earth. An impact piston 16 is adapted to move slidably within the bore of housing 12 from an upper cocked position as shown in FIG. 1 to a lower operated position (shown in dotted outline) in which piston 16 makes contact with the ground contacting target plate 20. The space between the top surface 22 of piston 16 and the closed top 24 of housing 12 constitutes a gas pressure chamber 26 of variable volume. Piston 16 terminates at its lower end external to the open bottom 28 of housing 12 in an enlarged diameter impact mass 32 having a convex impacting surface 34 adapted in operation to strike the mating concave surface 35 of upstanding pillar 36 of target plate 20.

Piston 16 is provided with a plurality of seal rings 38 adjacent its top surface 22 and a plurality of spaced apart longitudinally extending guide strips 40 affixed to the outer surface thereof. During the downward motion of piston 16, guide strips 40 maintain proper axial alignment with the bore of housing 12, their upper ends being beveled to insure proper mating with said bore upon return of piston 16 to its upper cocked position.

Piston 16 may be returned to its upper cocked position by means such as hydraulic lift cylinders 44 extending coaxially with the bore of housing 12 on either side thereof and provided respectively with lift rods 46 extending through apertures 50 in piston flange 52 extending radially outward of impact mass 32. The lower ends of lift rods 46 are provided with lift rings 54. Preparatory to the operation of generator 10, lift rods 46 are lowered to assume the dotted position as shown. Upon completion of a firing operation, lift rings 54 engage and bear upwardly against flange 52 so as to return piston 16 to its initial cocked position.

Piston 16 may be supported in the cocked position by any convenient means such as electrically operated latches 60. As shown, a pair of latches 60 move radially of housing 12 to supportively engage the under surface of flange 52. In operation, latches 60 are withdrawn, whereupon impact piston 16 is downwardly propelled by gas pressure in chamber 26 in addition to its own weight. Piston 16 is then accelerated rapidly so that convex impacting surface 34 strikes concave surface 35 to generate the desired seismic pulse.

Typically, chamber 26 is filled through conduit 27 to a first lower pressure in the downward most position of piston 16 from some suitable external source (not shown). Thereafter, piston 16 is retracted upwardly to its cocked position by means of hydraulic cylinders 44 so as to increase the pressure in chamber 26 in inverse proportion to the decrease in the volume thereof. Cylinders 44 may be operated from relatively low pressure compressor sources.

What has been described is essentially a closed pressure system wherein substantially no gas escapes from chamber 26 as the device is operated. Therefore, at the conclusion of each "shot" or operation, chamber 26 is repressurized to substantially the same pressure as before. In this manner, generator 10 may be cycled rapidly without the need for constantly replenished high volume accumulators as taught by the prior art. The initial pressurizing of chamber 26 may be accomplished at a relatively low pressure thus reducing the size of compressors required. Over time, some leakage from chamber 26 will necessarily occur, but by precision machining of parts and use of high-grade seals this leakage can be controlled sufficiently to permit a reasonable number of repetitive generator "shots" without significant energy degradation.

The fact that generator 10 constitutes a closed self-contained system makes it particularly well adapted for use in a man-portable, relatively light weight system, as well as in high energy devices employing heavy impact masses for deep earth penetration.

Figure 2:
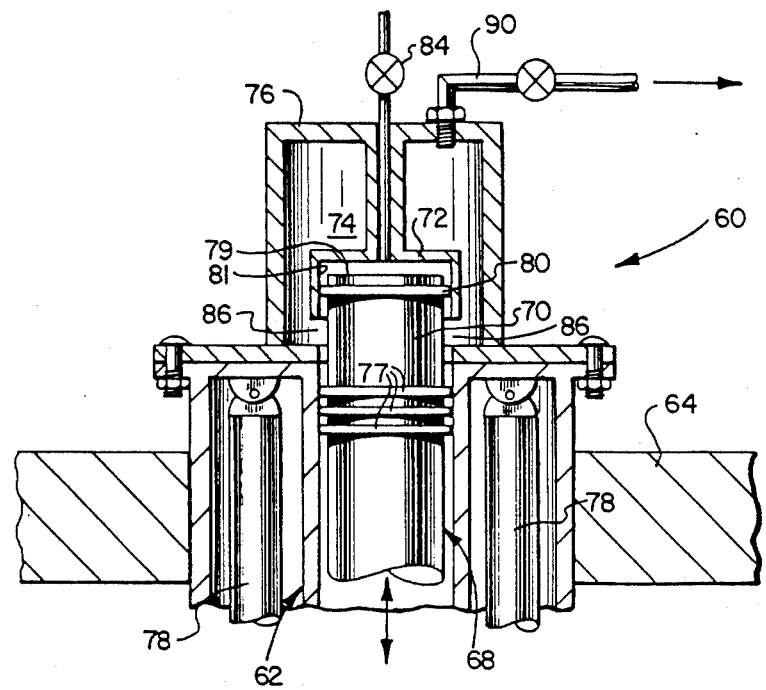
FIG. 2 is a partial sectional view of a seismic wave generator in accordance with an alternate embodiment of this invention.

In an alternate embodiment of this invention as shown in the partial view of FIG. 2, a generator 60 functioning in substantially the same manner and having components substantially similar to those of generator 10 includes a hollow upstanding cylindrical housing 62 (only the upper end of which is illustrated) which is supported by frame 64 from a transport vehicle (not shown). In the cocked position of impact piston 68, the upper end 70 thereof is received within and sealingly engaged by downwardly opening cap 72 supported in any suitable fashion within enclosed pressure chamber 74 communicating between housing top 76 and impact piston 68. Beneath cap 72, piston 68 engages the bore of housing 62 through hermetic seal rings 77. Retraction of piston 68 to its cocked position may be effected in the manner previously described in the embodiment of FIG. 1 by means of hydraulic cylinders 78. The distinguishing feature of this embodiment is that in the cocked position of piston 68, the gas pressure within chamber 74 is isolated from the upper surface 79 of piston 68 by means of seal ring 80. Thus, piston 68 in its cocked position is urged downwardly only by its own weight. Any gas trapped between upper surface 79 of piston 68 and the corresponding inner surface 81 of cap 72 may be vented to atmosphere through line 82 by operation of valve 84.

In operation, release of piston 68 through operation of latch means (not shown) permits piston 68 to fall under its own weight. When seal ring 80 disengages surface 81, pressure from chamber 74 infiltrates cap 72 through spaces 86 and pushes downwardly on the top surface 79 of piston 68 to powerfully accelerate it towards a target in the manner previously described.

As in the embodiment of FIG. 1, the pressure chamber 74 may be initially filled through line 90 from some external source (not shown) to a first lower pressure, the pressure therein being increased to a second higher pressure with the upper movement of piston 68 in response to the operation of hydraulic lift cylinders 78. This embodiment of the invention, however, possesses the additional feature that the latch means (not shown) for piston 68 need only support the weight of piston 68 in the cocked position. Therefore, such latch means may be correspondingly less substantial because subjected to lower mechanical stresses than in the embodiment of FIG. 1.

Figure 3:
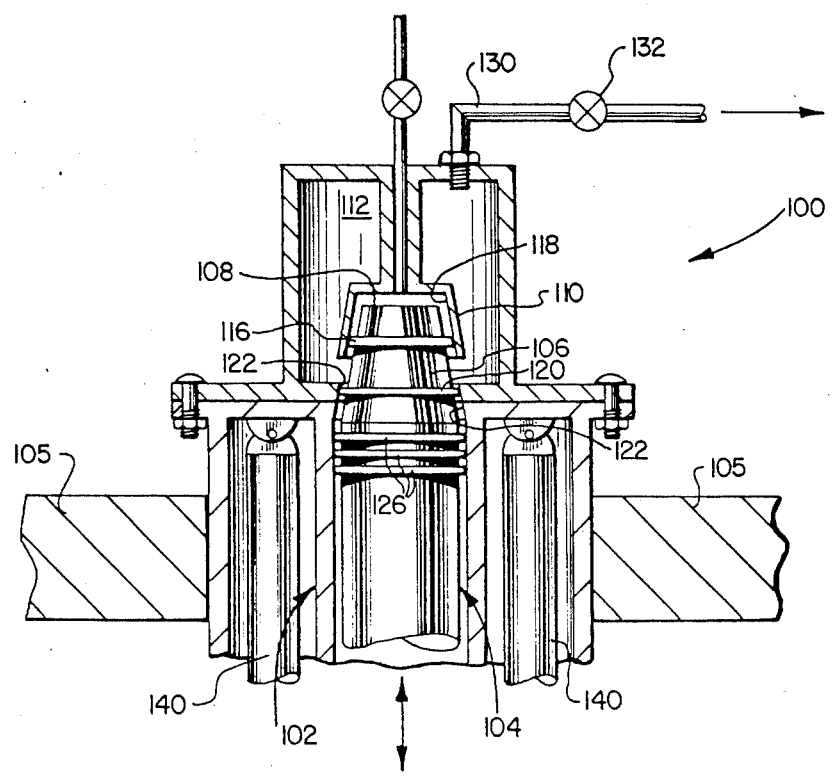
FIG. 3 is a partial sectional view of a seismic wave generator in accordance with a further alternate embodiment of this invention.

A further alternate embodiment of this invention is shown in FIG. 3 wherein a seismic wave generator 100 is shown in part including an upstanding hollow cylindrical housing 102 within which an impact piston 104 is slidably supported by suitable latching means (not shown). Housing 102 may be attached to a stabilizing transport vehicle through frame 105. In this embodiment, the upper end of impact piston 104 is provided with an upwardly tapered wall 106 terminating in upper face 108 which is adapted in the cocked position of piston 104 to be received within downwardly opening cap 110 supported in any suitable fashion within pressure chamber 112. Isolation between upper face 108 and the pressure in chamber 112 is secured by means of upper tapered seal ring 116 which contacts the mating tapered inner surface 118 of cap 110 in the cocked position of piston 104. Leakage of pressure in chamber 112 in a downward direction is initially prevented by means of a second lower tapered seal ring 120 which is adapted to contact the mating tapered bore surface 122 of housing 102 beneath the bottom of cap 110. Additional seal rings 126 of constant diameter circling piston 104 provide added protection against leakage as will be seen. In this embodiment, it will be observed that in the cocked position of piston 104, a portion of tapered surface 106 is in constant communication with the pressure in chamber 112. Therefore, a component of force due to the compressed gas in chamber 112 is constantly exerted downwardly against piston 104. The taper of surface 106 may be, for example, at an angle of about 5° to the axial direction, which is sufficient to provide an initial breakaway force on piston 104 in the event seals 116 and 120 tend to wedge against surfaces 118 and 122. The taper is not so great, however, that the downward pressure on the supporting latches (not shown) becomes excessive so as to risk leakage around seals 116 and 120. As in the embodiment of FIG. 2, except for the slight downward pressure against tapered surface 106 in the latched or cocked position, piston 104 is urged downwardly only by its own weight. In operation, when pressure from chamber 112 infiltrates cap 110, piston 104 disengages cap 110 and seals 116 and 120 no longer make contact with housing 102. Seal rings 126 thereafter prevent pressure from escaping from the confines of chamber 112 and the space above piston 104. In the manner previously described, chamber 112 may be initially pressurized through line 130 by operating valve 132 to admit gas from an external source (not shown). Hydraulic lift cylinders 140 lift piston 104 from its "fired" downward position to its cocked position and repressurize chamber 112 to operational pressure.

It should be understood that in any of the embodiments of this invention described, various gases may be used, such as, for example, nitrogen. If desired, dewatered air may be substituted. It is also evident that helical springs may be substituted for hydraulic cylinders to lift the generator piston to its cocked position.

In operation of this generator, it may be oriented either vertically or at any desired angle to the vertical so as to generate both shear and compressional wave components. The absence of heavy accumulators and compressors increases the manueverability of the device in varying such angle of orientation as well as making transportation less burdensome.

What has been described is illustrative only and many modifications of the features of this device will occur to those skilled in the art without departing from the scope of the invention as more particularly set forth in the claims appended hereto.

What is claimed is:

1. A seismic wave generator for impacting an earth-contacting target comprising:
   (a) a hollow cylindrical housing defining a bore having a closed and an open end and having a side wall penetrated by at least one port intermediate such closed and open ends;
   (b) means for supporting the housing in an upstanding position such that the closed end of the bore is uppermost and the target faces the open end;
   (c) an elongated piston extending movably within the bore through the open end thereof for reciprocating movement therein such that a clearance is formed within the bore between the closed end thereof and the piston;
   (d) a chamber filled with gas compressed to a selected value in a fluid communication with the bore through the port;
   (e) means for releasably supporting the piston in a cocked position wherein the piston projects above the port;
   (f) first annular seal means positioned intermediate the piston and the side wall of the bore for establishing slidable hermetic engagement therebetween above the port when the piston is in the cocked position such as to fluidly isolate the chamber from the clearance;
   (g) second annular seal means positioned intermediate the piston and the side wall of the bore for establishing slidable hermetic engagement therebetween below the port such as to prevent escape of gas through the open end of the bore irrespective of the position of such piston;
   (h) means for disabling the means for supporting the piston so as to permit the piston to fall from the cocked position, thereby effecting interruption of such slidable engagement thereof with the side wall of the bore above the port and enabling the gas to expand through the port into such clearance and to thereby drive the piston into the target; and
   (i) means for returning the piston to the cocked position, thereby repressurizing the gas in such chamber to substantially the selected value as a result of the flow of such gas from the bore into such chamber through the port.

2. Apparatus claimed in claim 1 further including valve means communicating with the clearance for venting gas pressure above the piston in excess of atmospheric upon return of the piston to the cocked position.

3. Apparatus as claimed in claim 1 wherein the piston is provided with an upwardly tapered side wall adjacent the upper end of the piston and the side wall of the bore has a correspondingly tapered portion adjacent its closed end, the port being disposed so as to penetrate the tapered side wall portion of the bore and expose the tapered wall of the piston to the pressure of the gas in the chamber when the piston is in the cocked position.

4. A seismic wave generator for impacting an earth-contacting target comprising:
   (a) a hollow cylindrical housing defining a bore having a closed and an open end and having a side wall penetrated by at least one port intermediate such closed and open end;
   (b) means for supporting the housing in an upstanding position such that the closed end of the bore is uppermost and the target faces the open end;
   (c) an elongated piston extending movably within the housing through the open end of the bore for reciprocating movement therein such that a clearance of variable volume is formed within the bore between the closed end and the piston;
   (d) a chamber filled with gas compressed to a selected value in communication with the bore through the port;
   (e) means for releasably supporting the piston in a cocked position wherein the piston projects above the port;
   (f) a first and a second annular seal ring carried on the piston in longitudinally spaced relation such that in the cocked position of the piston the first seal ring engages the side wall of the bore above the port in hermetic slidable relation so as to fluidly isolate the clearance from the chamber and such that in all positions of such piston the second seal ring engages the side wall of the bore below the port, thereby preventing escape of such gas through the open end of the bore;
   (g) means for disabling the means for supporting the piston thereby permitting the piston to fall until the first seal ring reaches the level of the port, thus effecting fluid communication between the chamber and the clearance through the port and enabling the gas to drive the piston downwardly to strike the target to generate a seismic wave, thereby reducing the pressure of the gas in such chamber in proportion to the increase in the volume of such clearance; and
   (h) means for returning the piston to such cocked position, thereby reducing the volume of the clearance and simultaneously repressurizing the gas in such chamber to substantially the selected value by the flow of such gas from the bore through the port.

* * * * *